241-275 SF

2/24/87 XR RE 32,363

United States Patent [19]

Warren et al.

[11] E Patent Number: Re. 32,363

[45] Reissued Date of Patent: Feb. 24, 1987

[54] ANVIL ASSEMBLY FOR VERTICAL SHAFT CENTRIFUGAL IMPACT CRUSHING MACHINE

[75] Inventors: Kenneth D. Warren; Gregory G. Tenold, both of Spokane, Wash.

[73] Assignee: Portec, Inc., Oak Brooke, Ill.

[21] Appl. No.: 648,811

[22] Filed: Sep. 7, 1984 (Under 37 CFR 1.47)

Related U.S. Patent Documents

Reissue of:

[64] Patent No.: 4,347,988
Issued: Sep. 7, 1982
Appl. No.: 160,811
Filed: Jun. 18, 1980

[51] Int. Cl.[4] ..... B02C 19/06

[52] U.S. Cl. ..... 241/300; 241/275

[58] Field of Search ..... 241/191, 195, 197, 275, 241/291, 300

[56] References Cited

U.S. PATENT DOCUMENTS 3,074,657 1/1963 Bridgewater ..... 241/275
3,110,449 11/1963 Bridgewater ..... 241/197 X
3,474,974 10/1969 Wood .

*Primary Examiner*—Howard N. Goldberg
*Assistant Examiner*—Timothy V. Eley
*Attorney, Agent, or Firm*—Wells, St. John & Roberts

[57] ABSTRACT

An anvil assembly 10 is described for a vertical shaft centrifugal impact crushing machine 11 for increasing the effective utilization of the assembly and for substantially reducing the cost to utilization ratio. The assembly 10 includes a wedge-shaped supporting base member 22 for attaching to a bracket 20 in which the base member 22 is cast of a high strength steel alloy material. The base member 22 has a wide longitudinal female dovetail groove 46 formed in an inclined front face 36 thereof extending between an upstream face 38 and a downstream face 40. The groove 54 has a shallow taper downward from the upstream face 38 to the downstream face 40. The assembly 10 includes a wedge-shaped wear resistant member 24 mountable to the base member 22 for receiving the particulate material from a central turntable. The wear resistant member 24 has a complementary wide male dovetail projection 82 formed on a back face 90 for slidably fitting into the female dovetail groove 46 to releasably secure the wear resistant member 24 to the base member 22. The base member 22 and the wear resistant member 24 have respective shoulder and abutment surfaces 67 and 88 for engaging each other to maintain a loose fit between the dovetail elements.

16 Claims, 6 Drawing Figures

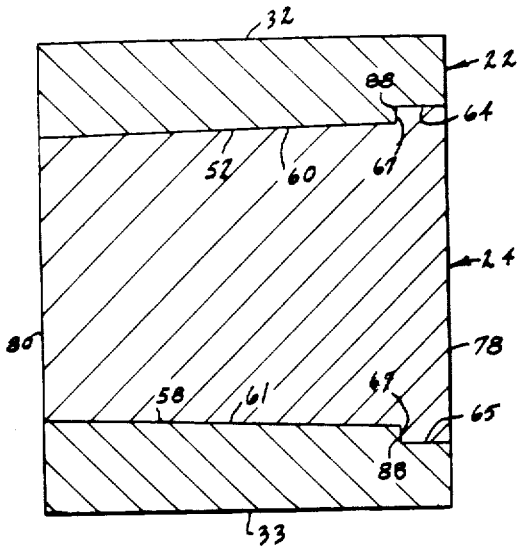
FIG 3
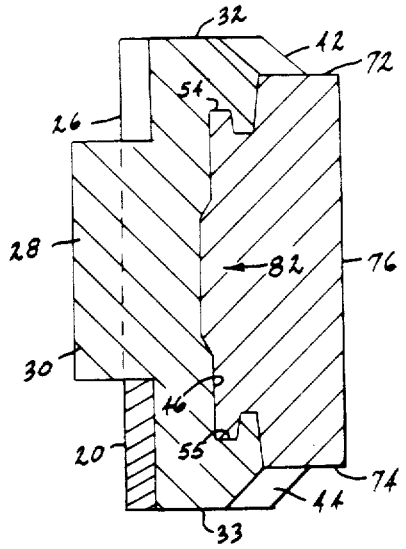
FIG 4
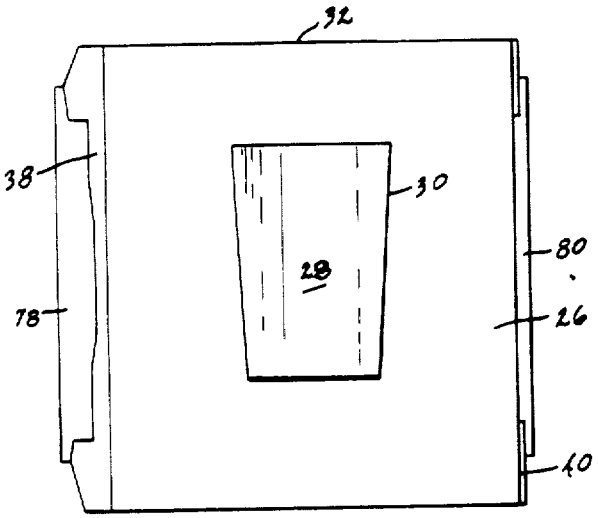
FIG 5
FIG 6
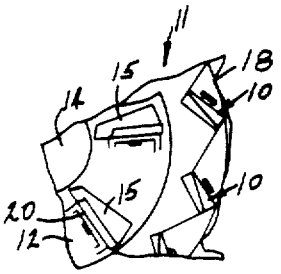

ANVIL ASSEMBLY FOR VERTICAL SHAFT CENTRIFUGAL IMPACT CRUSHING MACHINE

Matter enclosed in heavy brackets [ ] appears in the original patent but forms no part of this reissue specification; matter printed in italics indicates the additions made by reissue.

TECHNICAL FIELD

This invention relates to vertical shaft centrifugal impact crushing machines and more particularly to anvil assemblies for such machines for crushing particulate material.

BACKGROUND OF THE INVENTION

In a vertical shaft centrifugal impact crushing machine, the material is fed centrally onto a horizontal turntable that is rotated about a vertical axis at a high speed. Impeller shoes are mounted on the turntable causing the material to accelerate radially outward at increasing velocities from the central portion exiting from the turntable at very high velocities. An example of such machine is illustrated in the D. R. Warren U.S. Pat. No. 3,606,182 granted Sept. 20, 1971. The high velocity material is then impacted against anvil assemblies that are mounted about the periphery of the turntable. When the material impacts against the stationary anvil assemblies, the deacceleration forces cause the material to break into smaller pieces thereby effectively crushing the material.

One of the principal problems with the prior art anvil assemblies was the poor utilization of the wear resistant material before replacement was required. A large amount of the material of the anvil was unused.

One of the principal purposes of this invention is to provide an anvil assembly that greatly increases the efficiency of the anvil assembly with respect to weight and cost. A further objective is to provide an anvil assembly in which the amount of usable wear resistant material is greatly increased, thereby providing extended life to cost ratio for the anvil assemblies.

These and other objects and advantages of this invention will become apparent upon reading the following detailed description of a preferred embodiment.

BRIEF DESCRIPTION OF THE DRAWINGS

A preferred embodiment of this invention is illustrated in the accompanying drawings, in which:

FIG. 3 is a vertical cross-sectional view taken along line 3—3 in FIG. 1;

FIG. 4 is a transverse vertical cross-sectional view taken along line 4—4 in FIG. [2] *1* also showing a mounting plate;

FIG. 5 is a back view of the assembly illustrated in FIG. 1; and

FIG. 6 is a fragmentary plan view of the crushing chamber of a centrifugal impact crushing machine showing the mounting of the anvil assembly in the crushing chamber.

DETAILED DESCRIPTION OF A PREFERRED EMBODIMENT

Figure 1:
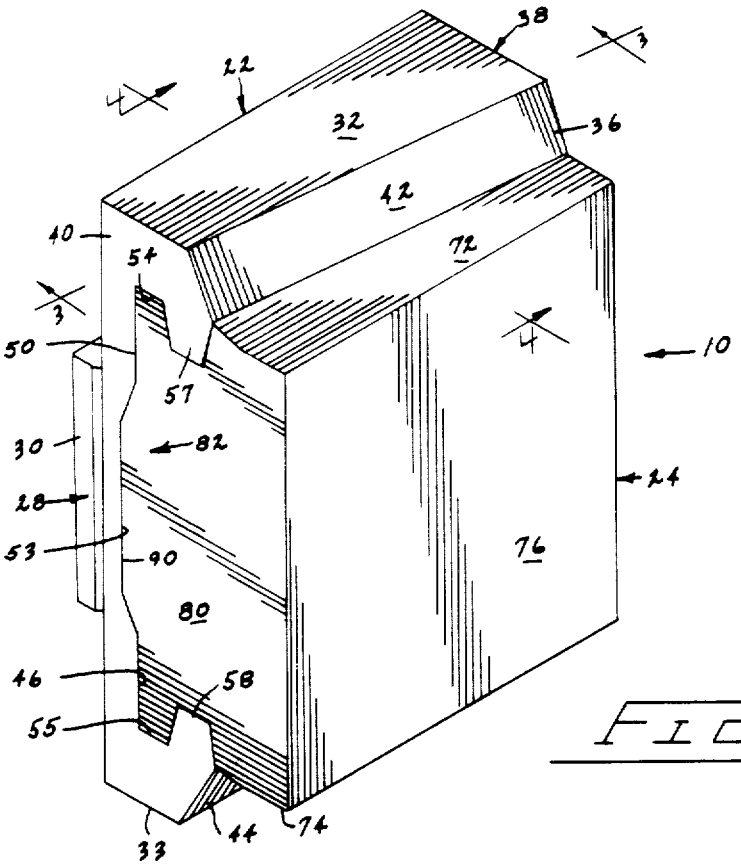
FIG. 1 is an isometric view of the anvil assembly which is the subject of this invention.

Referring now to the drawings, there is illustrated in FIG. 1 an anvil assembly 10 for mounting in a crushing machine generally designated with the numeral 11 in FIG. 6 in which the machine 11 has turntable assembly 12. The turntable assembly 12 has a distribution disc 14 at the central portion thereof for receiving the material and for directing the material outward along radially oriented angularly spaced shoes 15. The shoes 15 guide the material radially outward as the turntable assembly 12 is rotated at high speeds to accelerate the material and to throw the material at high velocities against the anvil assemblies 10 that are mounted peripherally about the turntable assembly as illustrated in FIG. 6. The crushing machine 11 includes a bracket member or ring 18 that includes the plurality of angularly spaced bracket plates 20 (FIG. 4) for receiving the anvil assembly 10. In this particular configuration, the bracket plate 20 includes a mounting notch (not shown) to receive the anvil assembly.

Figure 2:
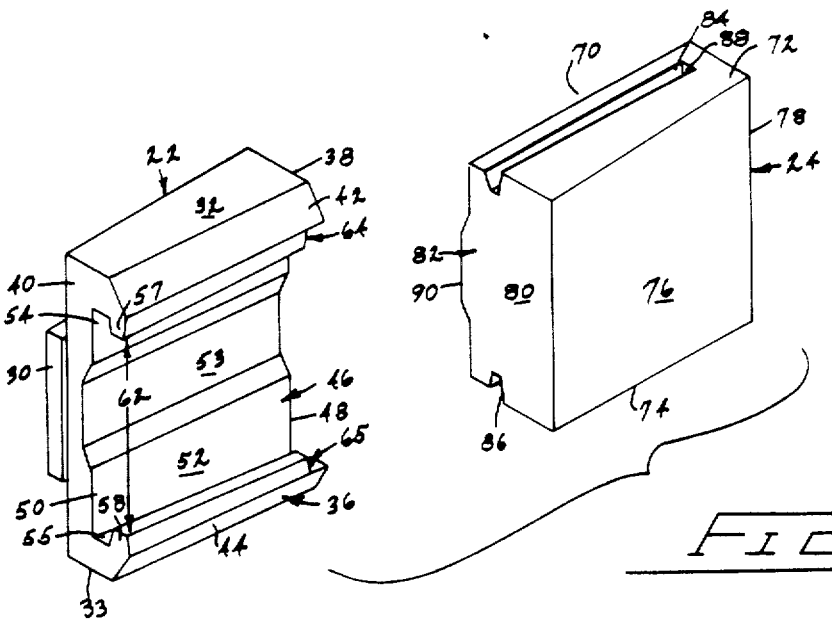
FIG. 2 is an isometric view of members of the assembly showing them separated.

Each anvil assembly 10 includes a supporting base member 22 for mounting directly to the bracket plate 20. The base member 22 is wedge-shaped when viewed in plan view. The anvil assembly includes a wear resistant member 24 that is also wedge-shaped when viewed in plan as illustrated in FIG. 1 and 2 and 6. The wear resistant member 24 receives the thrown material from the turntable assembly 12 to cause the material to rapidly [deaccelerate] *decelerate* causing the material to break into smaller particles to thereby crush the material.

The base member 22 includes a back face 26 that is adapted to bear against the bracket plate 20. The back face 26 has a *bracket mount-means such as* stob 28 that extends outwardly therefrom to fit within the mounting notch to releasably mount the anvil assembly to the mounting bracket 20. The stob 28 has an enlarged head 30 to secure the anvil assembly 10 to the bracket plate 20. The base member further includes a top face 32, a bottom face 33, a front face 36, an upstream side face 38 and a downstream side face 40. The front face 36 has upper and lower beveled surfaces 42 and 44 communicating with the top and bottom faces 32 and 33 respectively as illustrated in FIGS. 1 and 2.

The front face 36 further includes a wide female dovetail channel 46 that extends from the upstream side face 38 to the downstream side face 40 forming an entrance opening 48 in the upstream face 38 and an opening 50 (FIG. 2) in the downstream face 40. The wide female dovetail channel 46 may be referred to as a horizontally oriented dovetail channel. The channel 46 forms a channel wall 52 and channel recesses 54 and 55 adjacent the top face 32 and the bottom face 33 respectively. The channel recesses 54 and 55 form dovetail shoulders 57 and 58 with channel opening surfaces 60 and 61 respectively. The channel 46 provides a nominal width 62 between the channel opening surfaces 60 and 61.

In a preferred embodiment, the dovetail channel 46 is slightly tapered inward from the entrance opening 48 to the opening 50. Notches 64 and 65 are formed in the shoulders 57 and 58 adjacent the upstream side face 38 to form shoulder end surfaces 67.

The wear resistant member 24 has a tapered back face 70 that is complementary to the tapered front face 36 of base member 22. Member 24 further includes a top surface 72 and a bottom surface 74. The height of the wear resistant member 24 is less than the height of the base member 22 so that the top face 32 of the base member 22 extends above the top face 72 of the wear resistant member and the bottom face 33 of the base member 22 extends below the bottom face 74 of the wear resistant member 24. The beveled surfaces 42 and 44 are formed to provide an incline ramp or surface from the surfaces 72 and 74 to the surfaces 32 and 33 respectively. The wear resistant member 24 further includes an upstream side face 78 and a downstream side face 80. The back face 70 is at an inclined acute angle with respect to a front face 76 in which the acute angle is complementary to the tapered acute angle of the front face 36 with respect to the back face 26 of the base member 22.

In a preferred embodiment, the front face 76 of the wear resistant member 24 is substantially parallel with the back face 26 of the base member 22. The back face 70 of the wear resistant member 24 is formed at the same acute angle, however, in an opposite orientation to the front face 36 of the base member 22 as illustrated in FIG. 1 and 6.

The back face 70 includes a wide male dovetail projection 82 that extends substantially horizontal and is parallel to the back face 70 for sliding into and loosely fitting within the female dovetail channel 46. The male dovetail projection 82 has a slight taper from the upstream side face 78 to the downstream side face 80. The male dovetail projection 82 has recessed channels 84 and 86 (FIG. 2) that extends from the downstream side face 80 toward the upstream side face 82 to receive the shoulders 57 and 58 respectively. The recessed channels 84 and 86 terminate prior to the upstream side face 78 forming an end abutment surface or wall 88 (FIG. 2) for receiving and engaging the shoulder surface 67 of the base member 22 to laterally orient the wear resistant member 24 with respect to the base member 22. The end abutment surfaces 88 and the shoulder end surfaces 67 are located so that the wear resistant member 24 is centered with respect to the base member 22 to minimize wear of the base member 22 during ordinary operation and to maintain a loose fit between the interfitting dovetail elements.

The male dovetail projection 82 has a central ridge 90 formed therein that is complementary to and extends into the wall indentation 53 to increase the thickness of the wear resistant element 24 and its effective life.

It should be noted that the nominal width 62 of the dovetail channel 46 is greater than 50% of the height of the base member 22 from the top face 32 to the bottom face 33. Preferably the nominal width 62 is greater than two thirds of the height between the top face 32 and 33.

The anvil assembly 10 having the base member 22 receiving the wear resistant member 24 enables the user to dramatically increase the utilization of the anvil by merely replacing the wear resistant members 24 rather than the entire assembly. Additionally, the supporting base member 22 may be formed of a high strength, high impact cast steel such as a 8630 steel alloy to minimize breakage and to provide high strengths support; whereas the wear resistant member 24 may be formed of a high wear resistant material such as a high chromium alloy iron which does not have the same strength but has substantially increased wear resistant properties.

The shoulder end surfaces 67 and the abutment surfaces 88 are formed so that the male dovetail projection 82 loosely fits within the female dovetail channel 46. Because of the taper, the operator may merely tap the downstream side face 80 to loosen the wear resistant member 24 from the supporting base member 22 to replace the wear resistant member. This provides for easy removal and rapid change of the wear resistant members to expedite the operation of the machine and to minimize its down time.

It should be understood that the above described embodiment is simply illustrative of the principals of this invention and numerous other embodiments may be readily devised without deviating therefrom. Therefore, only the following claims are intended to define this invention.

What is claimed is:

1. An anvil assembly for mounting to a stationary bracket to position the anvil assembly in the path of material thrown from a rotating horizontal turntable of a vertical shaft centrifugal impact crushing machine to cause the material to disintegrate as the material impacts against the anvil assembly; comprising:

a wedge-shaped supporting base member having a bottom face, a top face, a back face, an inclined front face, an upstream side face and a downstream side face;

said front face being at an inclined acute angle with respect to the back face tapering inward from the upstream side face to the downstream side face;

said back face of the base member having bracket mounting means projecting therefrom adapted to secure the anvil assembly to the stationary bracket;

said front face of the base member having a horizontal female dovetail channel formed therein extending at the acute angle with respect to back face and parallel with the front face with an entrance opening in the upstream side face;

said base member having abutment surface formed adjacent the upstream face;

a wedge-shaped wear resistant member having a bottom face, a top face, a back face, a front face, an upstream side face and a downstream side face;

said back face *of the wear resistant member* being at an inclined acute angle with respect to the front face tapering inward from the downstream side face to the upstream side face;

said back face of the wear resistant member having a horizontal male dovetail projection formed thereon complementary to the female dovetail [groove] *channel* for enabling the male dovetail projection to slide into the female dovetail [groove] *channel* through the entrance opening to enable the wear resistant member to overface the base member with the front face of the wear resistant member facing the turntable to receive the material; and said wear resistant member having a shoulder surface for engaging the abutment surface of the base member to limit the sliding movement of the wear resistant member with respect to the base member and to align the wear resistant member centrally on the base member.

2. The anvil assembly as defined in claim 1 wherein the female dovetail groove and the male dovetail projection are tapered inward from their upstream faces toward their downstream faces.

3. The anvil assembly as defined in claim 1 wherein the female dovetail groove includes recessed horizontal channels formed therein adjacent the top and bottom faces defining front face shoulders and wherein the front face shoulders have notches formed therein recessed from the upstream side face of the base member defining the abutment surface for engaging the shoulder surface of the wear resistant member.

4. The anvil assembly as defined in claim 3 wherein the male dovetail projection includes recessed channels communicating with the downstream face that receive the front face shoulders of the base member and wherein the recessed channels of the wear resistant member terminate spaced from the upstream face forming the shoulder surface of the wear resistant member.

5. The anvil assembly as defined in claim 1 wherein the female dovetail channel includes a recessed central groove formed therein extending between side faces of the base member and wherein the male dovetail projection includes a central ridge complementary to the recessed central groove to extend the thickness of the wear resistant member intermediate the top and bottom faces.

6. The anvil assembly as defined in claim 1 wherein the female dovetail [groove] *channel* has a nominal opening width and wherein the nominal opening width of the female dovetail channel is greater than 50% of the distance between the top face and the bottom face of the base member.

*7. A wear resistant member for use with a supporting base member mounted in a vertical shaft centrifugal impact crushing machine to receive material thrown from a rotating horizontal turntable, comprising:*

*a wedge-shaped wear resistant member having a bottom face, a top face, a back face, a front face, an upstream side face and a downstream side face;*

*said back face being at an inclined acute angle with respect to the front face, tapering inwardly from the downstream side face to the upstream side face;*

*said back face of the wear resistant member having a horizontal male dovetail projection formed thereon for sliding into a complementary female dovetail channel on the supporting base member; and*

*said wear resistant member having a shoulder surface for engaging an abutment surface of the supporting base member to limit sliding movement of the wear resistant member with respect to the base member and to align the wear resistant member on the base member.*

*8. The wear resistant member defined in claim 7 wherein the male dovetail projection is tapered inwardly from the upstream side face to the downstream side face.*

*9. The wear resistant member defined in claim 7 wherein the male dovetail projection includes recessed channels communicating with the downstream side face, for receiving dovetail shoulders of the complementary supporting base member.*

*10. The wear resistant member defined in claim 9 wherein the recessed channels terminate spaced from the upstream side face to form the shoulder surface thereof.*

*11. The wear resistant member defined in claim 7 wherein the dovetail projection includes a central ridge which increases the thickness of the wear resistant member intermediate the top and bottom faces.*

*12. A supporting base member for mounting in a vertical shaft centrifugal impact crushing machine to support a wear resistant member thereon, comprising:*

*a wedge-shaped supporting base member having a bottom face, a top face, a back face, an inclined front face, an upstream side face, and a downstream side face;*

*said front face being longitudinally rectilinear and inclined at an acute angle with respect to the back face, tapering inwardly from the upstream side face to the downstream side face;*

*said back face having a bracket mounting means thereon adapted to secure the base member and any attached wear resistant member to a stationary bracket of the crushing machine;*

*said front face of the base member having a horizontal rectilinear female dovetail channel formed therein extending at approximately the acute angle with respect to the back face and approximately parallel with the front face with an entrance opening in the upstream side face, to allow the wear resistant member having a complementary male dovetail projection to slide into the female dovetail channel; and*

*said base member having a transverse shoulder surface formed thereon at the upstream side face; said shoulder surface extending transversely rearward from the front face for engaging an abutment surface on the wear resistant member transversely of the rectilinear front face and thereby prevent relative sliding movement of the wear resistant member from the upstream side face toward the downstream side face.*

*13. The supporting base member as defined in claim 12 wherein the female dovetail channel is tapered inwardly from the upstream side face toward the downstream side face.*

*14. The supporting base member as defined in claim 12 wherein the female dovetail channel includes recessed horizontal channels formed therein adjacent the top and bottom faces defining dovetail shoulders; at least one of the dovetail shoulders having notches formed therein recessed from the upstream side face of the base member to form the shoulder surface to engage the abutment surface of the wear resistant member.*

*15. The supporting base member as defined in claim 12 wherein the female dovetail channel includes a recessed central groove intermediate the top and bottom faces extending between side faces of the base member.*

*16. The supporting base member as defined in claim 12 wherein the female dovetail channel has a nominal opening width which is greater than 50% of the distance between the top face and the bottom face thereof.*

* * * * *